US005544673A

United States Patent [19]

Irgens

[11] Patent Number: 5,544,673

[45] Date of Patent: Aug. 13, 1996

[54] METHOD AND ARRANGEMENT FOR ASSEMBLING FUEL INJECTION NOZZLES

[75] Inventor: Christopher R. Irgens, Elm Grove, Wis.

[73] Assignee: Outboard Marine Corporation, Waukegan, Ill.

[21] Appl. No.: 428,338

[22] Filed: Apr. 25, 1995

Related U.S. Application Data

[63] Continuation-in-part of Ser. No. 276,718, Jul. 18, 1994, Pat. No. 5,472,013.

[51] Int. Cl.$^{6}$ .................... F16K 17/04

[52] U.S. Cl. .................... 137/15; 137/541

[58] Field of Search .................... 137/15, 541

[56] References Cited

U.S. PATENT DOCUMENTS

| | | | |
|---|---|---|---|
| 3,351,081 | 11/1967 | Bogossian | 137/541 X |
| 4,750,514 | 6/1988 | Omori et al. | 137/339 |
| 4,938,451 | 7/1990 | Weaver et al. | 251/129 |
| 5,127,156 | 7/1992 | Yokoyama et al. | 29/890.143 |
| 5,295,627 | 3/1994 | Wahba | 239/585.4 |
| 5,390,411 | 2/1995 | Vogt et al. | 29/890 |

*Primary Examiner*—Robert G. Nilson
*Attorney, Agent, or Firm*—Michael, Best & Friedrich

[57] ABSTRACT

Disclosed herein is a nozzle assembly comprising a housing including a central bore having, at one end thereof, a valve seat, an elongated needle member having, at one end thereof, a valve portion engageable with the valve seat, and having, at the other end thereof, an end portion, a retainer member having therein a bore receiving the end portion of the needle, and being fixed to the end portion of the needle, and a spring acting between the housing and the retainer member to bias the valve portion into engagement with the valve seat, and a method of assembly therefor comprising the steps of locating the needle member in the bore in the housing with the valve portion in engagement with the valve seat and with the end portion extending from the housing, locating the spring in surrounding relation to the end portion of the needle member and in operative engagement with the housing, locating the retainer member with the end portion of the needle member passing through the bore in the retainer member, spacing the retainer member from the housing with the spring in compression between the retainer member and the housing, fixing the retainer member to the end portion while maintaining the spacing of the retainer from the housing and while maintaining the engagement of the valve portion of the needle member with the valve seat and with the spring in compression between the housing and the retainer member, and removing the spacing from between the housing and the retainer member, thereby permitting movement of the valve portion of the needle member away from the valve seat in opposition to action of the spring.

12 Claims, 1 Drawing Sheet

METHOD AND ARRANGEMENT FOR ASSEMBLING FUEL INJECTION NOZZLES

RELATED APPLICATION

This application is a continuation-in-part of my prior application Ser. No. 276.718, filed Jul. 18, 1994, now U.S. Pat. No. 5,472,013 which prior application is incorporated herein by reference.

BACKGROUND OF THE INVENTION

The invention relates generally to fuel injection nozzles, and more particularly, to methods for assembling fuel injector nozzles and to nozzle constructions facilitating such methods. Attention is directed to the following U.S. Pat. Nos.

4,750,514-Issued Jun. 14, 1988

4,938,451-Issued Jul. 3, 1990

5,127,156-Issued Jul. 7, 1992

5,295,627-Issued Mar. 2, 1994

SUMMARY OF THE INVENTION

The invention provides a method of assembling a nozzle assembly comprising a housing including a central bore having, at one end thereof, a valve seat, an elongated needle member having, at one end thereof, a valve portion engageable with the valve seat, and having, at the other end thereof, an end portion, a retainer member having therein a bore receiving the end portion of the needle, and being fixed to the end portion of the needle, and a spring acting between the housing and the retainer member to bias the valve portion into engagement with the valve seat, which method comprises the steps of locating the needle member in the bore in the housing with the valve portion in engagement with the valve seat and with the end portion extending from the housing, locating the spring in surrounding relation to the end portion of the needle member and in operative engagement with the housing, locating the retainer member with the end portion of the needle member passing through the bore in the retainer member, spacing the retainer member from the housing with the spring in compression between the retainer member and the housing, fixing the retainer member to the end portion while maintaining the spacing of the retainer from the housing and while maintaining the engagement of the valve portion of the needle member with the valve seat and with the spring in compression between the housing and the retainer member, and removing the spacing from between the housing and the retainer member, thereby permitting movement of the valve portion of the needle member away from the valve seat in opposition to action of the spring.

The invention also provides a method of assembling a nozzle assembly comprising a housing including a central bore having, at one end thereof, a valve seat, an elongated needle member having, at one end thereof, a valve portion engageable with the valve seat, and having, at the other end thereof, an end portion, a retainer member having therein a bore receiving the end portion of the needle, and being fixed to the end portion of the needle, and a spring acting between the housing and the retainer member to bias the valve portion into engagement with the valve seat, which method comprises the steps of locating the needle member in the bore in the housing with the valve portion in engagement with the valve seat and with the end portion extending from the housing, locating a shim outwardly of the housing in adjacent relation to the end portion of the needle member, locating the spring in surrounding relation to the end portion of the needle member and in engagement with the housing, locating the retainer member with the end portion of the needle member passing through the bore in the retainer member, and with the shim between the retainer member and the housing, and with the spring in compression between the retainer member and the housing, fixing the retainer member to the end portion of the needle member with the valve portion of the needle member in engagement with the valve seat, with the shim between the retainer ember and the housing, and with the spring in compression between the housing and the retainer member, and removing the shim from between the housing and the retainer member, thereby permitting movement of the valve portion away from the valve seat in opposition to action of the spring.

The invention also provides a method of assembling a nozzle assembly comprising a housing including a central bore having, at one end thereof a valve seat, an elongated needle member having, at one end thereof, a valve portion engageable with the valve seat, and having, at the other end thereof, an end portion, a retainer assembly including an inner retainer member having therein a bore receiving the end portion of the needle, and an outer retainer member having therein a bore receiving the end portion of the needle, being located outwardly of the inner retainer member, and being fixed to the end portion of the needle, and a spring acting between the housing and the inner retainer member to bias the valve portion of the needle member into engagement with the valve seat, which method comprises the steps of locating the needle member in the bore in the housing and with the valve portion in engagement with the valve seat, and with the end portion extending from the housing, locating the spring in surrounding relation to the end portion of the needle member and in engagement with the housing, locating the inner retainer member with the end portion of the needle member passing through the bore in the inner retainer member and in engagement with the spring, locating a shim outwardly of and in engagement with the inner retainer member, locating the outer retainer member outwardly of and in engagement with the shim and with the end portion of the needle passing through the bore in the outer retainer member, fixing the outer retainer member to the end portion of the needle member with the valve portion of the needle member in engagement with the valve seat, with the shim located between the inner and outer retainer members, and with the spring in compression between the housing and the inner retainer member, and removing the shim from between the retainer members, thereby permitting movement of the valve portion away from the valve seat in opposition to action of the spring.

The invention also provides a method of assembling a nozzle assembly comprising a housing including a central bore having, at one end thereof, a valve seat, an elongated needle member having an axis, having, at one end thereof, a valve portion engageable with the valve seat, and having, at the other end thereof, an end portion, a retainer assembly including an inner retainer member having therein a bore receiving the end portion of the needle, and an outer retainer member having therein a bore receiving the end portion of the needle, being located outwardly of the inner retainer member, and being fixed to the end portion of the needle, one of the retainer members having a flat surface extending perpendicularly with respect to the needle member axis and having therein a recess extending diametrically with respect to the needle member axis, and the other of the retainer members having a flat surface having thereon a projection extending diametrically with respect to the needle member axis and having an outer planar surface extending parallel to the flat surfaces, and a spring acting between the housing and the retainer assembly to bias the valve portion into engagement with the valve seat, which method comprises the steps of locating said needle member in the bore in the housing with the valve portion in engagement with the valve seat and with the end portion extending from the housing, locating the spring in surrounding relation to the end portion of the needle member and in engagement with the housing, locating the inner retainer member with the end portion of the needle member passing through the bore in the inner retainer member and in engagement with the spring, thereby biasing the retainer assembly outwardly, and with the flat surface of the one retainer member located remotely from the housing, locating the outer retainer member with the end portion passing through the bore in the outer retainer member and with the flat surface of the one retainer member in engagement with the outer surface of the projection, and fixing the outer retainer member to the end portion of the needle member with the valve portion of the needle member in engagement with the valve seat, with the outer surface of the projection in engagement with the flat surface of the one retainer member, and with the spring in compression, and moving the retainer members relative to each other until the projection is received into the recess and the flat surfaces engage each other, thereby permitting movement of the valve portion of the needle member away from the valve seat in opposition to the action of the spring.

The invention also provides a nozzle assembly comprising a housing including an elongated central bore having, at one end thereof, a valve seat, an elongated needle member having, at one end thereof, a valve portion engageable with the valve seat and having, at the other end thereof, an end portion, a retainer fixable to the end portion of the needle member at a predetermined distance from the valve portion of the needle member, a spring acting between the housing and the retainer for biasing the valve portion of the needle member against the valve seat, and removable spacer means for holding the retainer at a predetermined distance from the valve seat during fixing of the end portion of the needle member to the retainer.

Other features and advantages of the invention will become apparent to those skilled in the art upon review of the following detailed description, claims and drawings.

Figure 5:
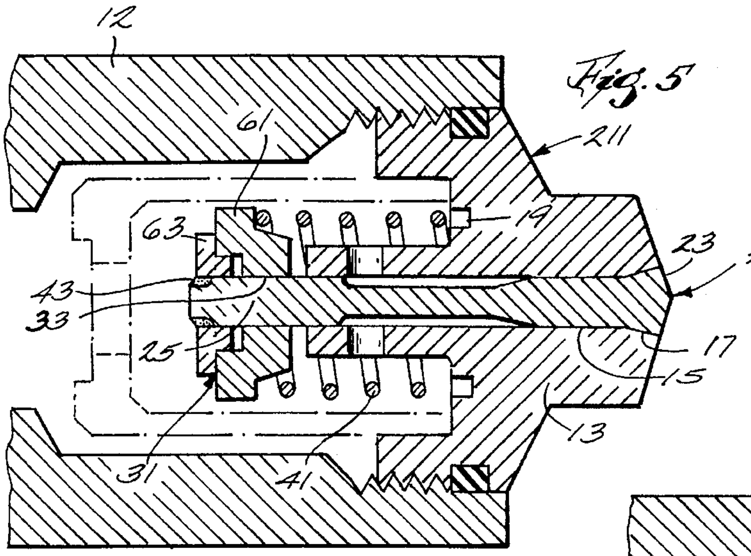
FIG. 5 is a fragmentary sectional view of still another embodiment of a nozzle assembly which incorporates various of the features of the invention and which is shown in the condition after assembly.

Before embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in the drawings are several nozzle assembly embodiments which include, as shown best in FIG. 5, an outer valve housing or housing member 12 and an inner valve housing or housing member 13 which is suitably fixed to the outer housing 12, as for example by screw threads, and which includes an elongated central bore 15 which, at one end, defines a valve seat 17. At the opposite end from the valve seat 17, the housing member 13 is preferably provided with an annular groove 19 which surrounds the central bore 15 and which is adapted to receive a spring still to be described.

Extending in the valve housing 13 is a needle valve or member 21 which is moveable relative to the valve housing or nozzle member 13 between an open position and a closed position. At one end, the valve member 21 includes a valve portion 23 which is engageable with the valve seat 17 included in the valve housing or nozzle member 13 to define the closed position. The needle valve or member 21 also includes an outer end portion 25 which projects from the valve housing 13 at the end thereof opposite from the valve seat 17.

The outer end portion 25 of the needle member 21 is fixed to a retainer or retainer assembly 31 which can take various forms, which includes a central bore 33 receiving the outer end portion 25 of the needle member 21, and which is biased to locate the needle member 21 in the closed position by suitable spring means which, in the disclosed construction, comprises a helical spring 41 which, at one end, bears against the housing member 13, and which, at the other end, bears against the retainer 31. When subject to fuel under sufficient pressure, the valve portion 23 of the needle member 21 moves to the right in the drawings and away from the valve seat 17 in opposition to the action of the spring 41. The distance between the open and closed positions is the stroke of the needle member 21.

The nozzle assembly 11 also includes means for defining or establishing the stroke of the needle member 21 during the fixation of the retainer 31 and the needle member 21, which fixation can be accomplished in any suitably manner, such as by laser welding, as inducated at 43.

The nozzle assembly is assembled in accordance with a method which comprises the steps of locating the needle member 21 in the bore 15 in the housing member 13 with the valve portion 23 in engagement with the valve seat 17 and with the outer end portion 25 extending from the housing member 13, locating the spring 41 in surrounding relation to the outer end portion 25 of the needle member 21 and in operative engagement with the housing member 13, locating the retainer 31 with the outer end portion 25 of the needle member 21 passing through the bore 33 in the retainer 31, spacing the retainer 31 from the housing member 13 with the spring 41 in compression between the retainer 31 and the housing member 13, fixing the retainer 31 to the outer end portion 25 of the needle member 21 while maintaining the spacing of the retainer 31 from the housing member 13 and while maintaining the engagement of the valve portion 23 of the needle member 21 with the valve seat 17 and with the spring 41 in compression between the housing member 13 and the retainer 31, and removing the spacing from between the housing member 13 and the retainer 31, thereby permitting movement of the valve portion 23 of the needle member 21 away from the valve seat 17 in opposition to action of the spring 41.

While other constructions can be employed to define the stroke of the needle member 21, i.e., to space the retainer 31 from the housing member 13 at a predetermined distance, in the construction shown in FIG. 1, there is disclosed a nozzle assembly 11 which, except as noted hereinafter, is constructed as explained above and which includes a shim 51 interposed between the housing member 13 and the retainer 31 and retained in such position during the fixing, as by laser welding, of the retainer 31 and the needle member 21. After such fixation, the shim 51 is removed, thereby allowing movement of the valve portion 23 of the needle member 21 away from the valve seat 17 and through the stroke thereof to the open position against the action of the spring 41.

Figure 2:
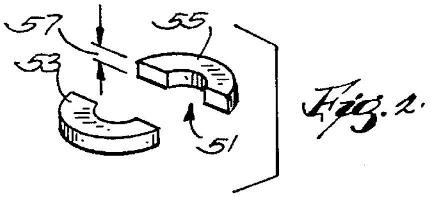
FIG. 2 is a perspective view of one of the components included in the nozzle assembly shown in FIG. 1.

The shim 51 can be constructed of various materials, such as metal, plastic, or glass, and can be removed from between the housing member 13 and the retainer 31 in various ways, such as by being physically withdrawn, by being dissolved, or by being burned out. One example of such a shim is shown in FIG. 2 and includes two parts 53 and 55 and has a thickness 57 corresponding to the desired stroke length.

Figure 1:
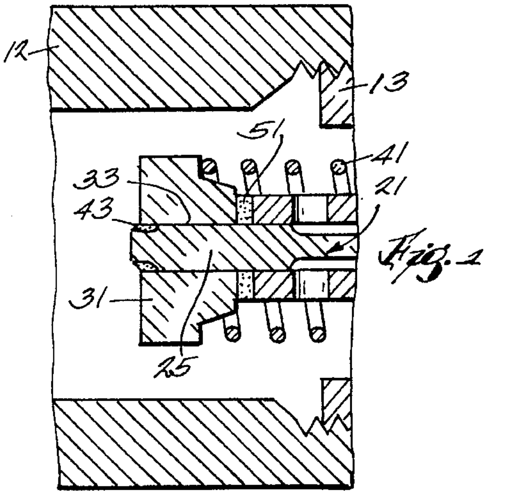
FIG. 1 is a fragmentary sectional view of one embodiment of a nozzle assembly which incorporates various of the features of the invention.

When assembling the nozzle assembly 11 shown in FIG. 1, the method can also include the steps of locating the needle member 21 in the bore 15 in the housing member 13 with the valve portion 23 in engagement with the valve seat 17 and with the outer end portion 25 extending from the housing member 13, locating the shim 51 outwardly of the housing member 13 in adjacent relation to the outer end portion 25 of the needle member 21, locating the spring 41 in surrounding relation to the outer end portion 25 of the needle member 21 and in engagement with the housing member 13, locating the retainer 31 with the outer end portion 25 of the needle member 21 passing through the bore 33 in the retainer 31, and with the shim 51 between the retainer 31 and the housing member 13, and with the spring 41 in compression between the retainer 31 and the housing member 13, fixing the retainer 31 to the outer end portion 25 of the needle member 21 with the valve portion 23 of the needle member 21 in engagement with the valve seat 17 and with the spring 41 in compression between the housing member 13 and the retainer 31, and removing the shim 51 from between the housing member 13 and the retainer 31, thereby permitting movement of the valve portion 23 away from the valve seat 17 in opposition to action of the spring 41.

Figure 3:
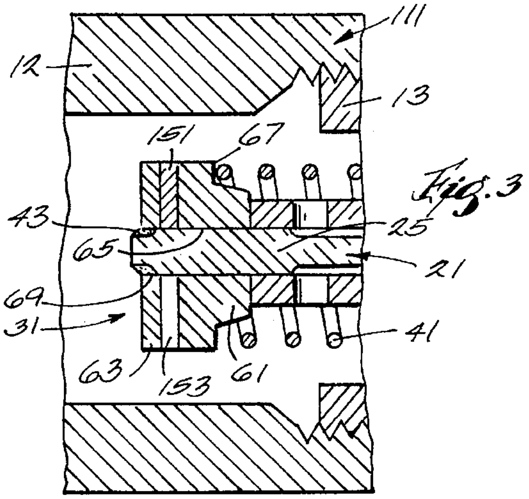
FIG. 3 is a fragmentary sectional view of another embodiment of a nozzle assembly which incorporates various of the features of the invention.

In the construction of FIG. 3, a nozzle assembly 111 is shown, which nozzle assembly 111 is of the same construction as earlier explained, except as disclosed hereafter. Specifically, in the nozzle assembly 111, the retainer 31 comprises an assembly of an inner retainer or member 61 and an outer retainer or member 63. The inner retainer or member 61 includes a central bore 65 freely accepting passage therethrough of the outer end portion 25 of the needle member 13, and an annular shoulder 67 against which the spring 41 bears to bias the needle member 21 to the closed position.

Figure 4:
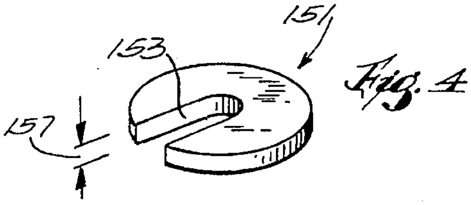
FIG. 4 is a perspective view of one of the components included in the nozzle assembly shown in FIG. 3.

The outer member 63 also includes a central bore 69 which receives the outer end portion of the needle member 13 and is suitably fixed to the outer end portion 25 of the needle member 21, such as by laser welding. A shim 151 is located between the inner and outer retainers or members 61 and 63. Thus, in this construction, the shim 151 is located in spaced relation from the spring 41 to facilitate easy withdrawal of the shim 151 from between the inner and outer retainers or members 61 and 63. While other shim constructions can be employed, one suitable shim 151 having a notch 153 to receive the outer end portion 25 of the needle member 21 is shown in FIG. 4. The shim 151 has a thickness 57 corresponding to the desired stroke length.

When assembling the nozzle assembly 111 shown in FIG. 4, the method comprises the steps of locating the needle member 21 in the bore 15 in the housing member 13 and with the valve portion 23 in engagement with the valve seat 17, and with the outer end portion 25 extending from the housing member 13, locating the spring 41 in surrounding relation to the outer end portion 25 of the needle member 21 and in engagement with the housing member 13, locating the inner retainer member 61 with the outer end portion 25 of the needle member 21 passing through the bore 65 in the inner retainer member 61 and in engagement with the spring 41, locating the shim 51 outwardly of and in engagement with the inner retainer member 61, locating the outer retainer member 63 outwardly of and in engagement with the shim 51 and with the outer end portion 15 of the needle member 21 passing through the bore 69 in the outer retainer member 63, fixing the outer retainer member 63 to the outer end portion 25 of the needle member 21 and with the spring 41 in compression between the housing member 13 and the inner retainer member 61, and removing the shim 51 from between the retainer members 61 and 63, thereby permitting movement of the valve portion 23 of the needle member 21 away from the valve seat 17 in opposition to action of the spring 41.

Figure 6:
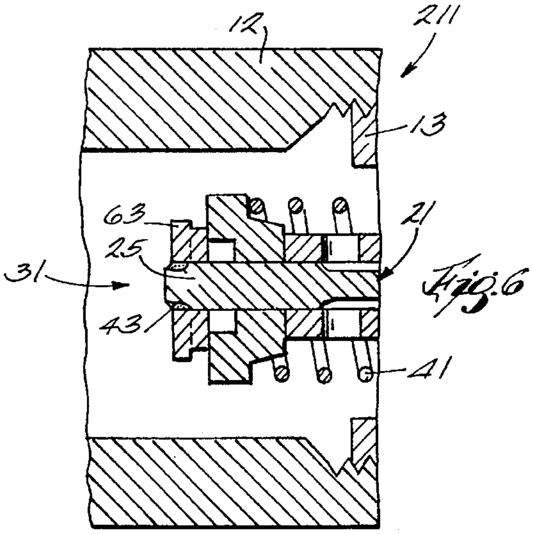
FIG. 6 is fragmentary sectional view of the nozzle assembly which is shown in FIG. 5 and which is shown in the condition during fixing of the outer retainer on the needle member.

Shown in FIGS. 5 and 6, is another nozzle assembly 211 which is of the same construction as previously explained, except as disclosed hereinafter. In the nozzle assembly 211, the retainer 31 includes inner and outer retainer 61 and 63. Means are also provided for removably spacing the inner and outer retainers 61 and 63. While other constructions can be employed, in the disclosed construction, such means comprises the provision, on one of the retainers 61 and 63, of (see FIG. 7) a flat surface 71 which extends perpendicularly to the elongation of the needle member 21, which faces the other of the retainers 61 and 63, and which includes therein a recess 73 which can take various forms, which, in the disclosed construction, is in the form of a keyway, which has a depth greater than the stroke of the needle member 21, and which preferably extends perpendicularly to the length of the needle member 21.

In addition, the other one of the retainer members 61 and 63 is provided with a flat surface 77 which faces the flat surface 71 of the one retainer member and which has thereon a projection 79 which can take various forms, which, in the disclosed construction, is in the form of a key which is adapted to be received into the recess 73, and which has an outer planar face or surface 81 extending perpendicularly to the elongation of the needle member 21, i.e., parallel to the flat surfaces 71 and 75, and spaced from the flat surface 77 at a distance equal to the desired stroke of the needle member 21. Preferably, the projection 79 also extends diametrically to the length of the needle valve or member 21.

Figure 7:
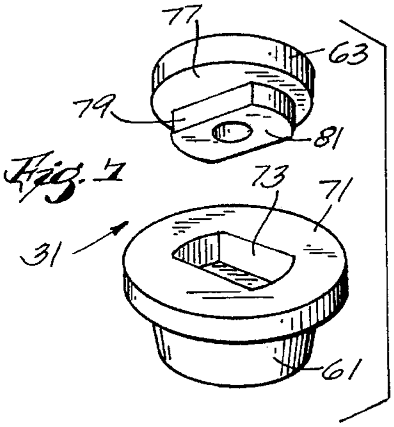
FIG. 7 is a perspective view of two of the components incorporated in the nozzle assembly shown in FIGS. 5 and 6.

In the specifically disclosed construction shown in FIGS. 5, 6, and 7, the inner retainer member 61 includes the flat surface 71 and the recess 73, and the outer retaining member 63 includes the flat surface 77 and the projection 79.

When assembling the nozzle assembly 211 shown in FIGS. 5, 6, and 7, the method includes the steps of locating the needle member 21 in the bore 15 in the housing member 13 with the valve portion 23 in engagement with the valve seat 17 and with the outer end portion 25 extending from the housing member 13, locating the spring 41 in surrounding relation to the outer end portion 25 of the needle member 21 and in engagement with the housing member 13, locating the inner retainer member 61 with the outer end portion 25 of the needle member 21 passing through the bore 65 in the inner retainer member 61, with the flat surface 71 of the inner retainer member located remotely from the housing member 13, and with the shoulder 67 in engagement with the spring 41, thereby biasing outwardly the inner retainer member 61, locating the outer retainer member 63 with the outer end portion 25 of the needle member 21 passing through the bore 69 in the outer retainer member 69 and with the flat surface 71 of the inner retainer member 61 in engagement with the outer face 81 of the projection 79, and fixing the outer retainer member 63 to the outer end portion 25 of the needle member 21, as by laser welding, with the flat surface 71 of the inner retainer member 61 in engagement with the outer face 81 of the projection 79 and with the spring 41 in compression, and moving the inner and outer retainer members 61 and 63 relative to each other until the projection 79 is received into the recess 73 and the flat surfaces 71 and 77 engage each other, thereby permitting movement of the valve portion 23 of the needle member 21 away from the valve seat 17 in opposition to the action of the spring 41.

In the specifically disclosed method, the assembled nozzle is removed from the associated fixture and the step of relatively moving the inner and outer retainer members 61 and 63 is the performed by rotating the retainer members relative to each other until the projection 79 is received in the recess 73 and the flat surfaces 71 and 77 of the inner and outer retainer members 61 and 63 are engaged with each other, thereby affording movement of the valve portion 23 of the needle member 21 away from the valve seat 17 in opposition to the action of the spring 41 and through the length of the stroke of the needle member 21 in response to the presence of fuel under sufficient pressure.

During subsequent use, the force of the spring 41 maintains the retainer members 61 and 63 in interlocked relation, i.e., maintains the projection 79 in the recess 73.

The disclosed assembly methods can be performed using a simple fixture (not shown) which locates the center line of the assembly and compresses the assembly to remove any clearance between components. The disclosed assembly methods involve holding the nozzle housing 13 by the fixture which does not other wise take part in establishing the stroke length apart from compressing the components to engage the valve portion of the needle member with the valve seat. In addition, the disclosed assembly methods also avoid variations in stroke length which can occur in response to build up of tolerances in the piece parts making up the nozzle assembly. Fixing of the needle member 21 to the retainer 31 in accordance with the disclosed methods establishes the stroke length of the needle member 21 independently of variation in the dimensions of the piece parts and without dependence on the configuration of the assembly fixture, thereby avoiding subjecting the stroke length to tolerance variations.

My earlier application Ser. No. 276,718 contemplates using a fixture to clamp the nozzle housing or housing member and allowed the needle member to stroke a given amount prior to fixing together (welding) the needle member and the retainer. Such assembly requires a sophisticated fixture capable of repeated referencing of the needle member to the valve seat on the housing member. In addition, some inherent inaccuracies occur in such fixing due to the mechanical operation of the fixture and because repeated operation can, over time, result in inaccuracy due to wear. As a consequence, the long term repeatability of the needle member stroke may vary more than desired. While means are available by adding gauging and controls to minimize and or compensate for such mechanical inaccuracies, such minimization and or compensation involves increased cost and maintenance. The disclosed constructions and methods avoid these disadvantages.

One particular advantage of the embodiment shown in FIG. 5 is that the stroke length of the needle member 21 can be simply controlled by machining of the outer surface 81 of the projection 79 to the desired height above the flat face 75. In addition, the use of sophisticated fixtures is avoided and repeatably of the stroke length is reliably obtained.

Various of the features of the invention are set forth in the following claims.

I claim:

1. A method of assembling a nozzle assembly comprising a housing including a central bore having, at one end thereof, a valve seat, an elongated needle member having, at one end thereof, a valve portion engageable with the valve seat, and having, at the other end thereof, an end portion, a retainer member having therein a bore receiving the end portion of the needle, and being fixed to the end portion of the needle, and a spring acting between the housing and the retainer member to bias the valve portion into engagement with the valve seat, said method comprising the steps of locating the needle member in the bore in the housing with the valve portion in engagement with the valve seat and with the end portion extending from the housing, locating the spring in surrounding relation to the end portion of the needle member and in operative engagement with the housing, locating the retainer member with the end portion of the needle member passing through the bore in the retainer member, spacing the retainer member from the housing with the spring in compression between the retainer member and the housing, fixing the retainer member to the end portion while maintaining the spacing of the retainer from the housing and while maintaining the engagement of the valve portion of the needle member with the valve seat and with the spring in compression between the housing and the retainer member, and removing the spacing from between the housing and the retainer member, thereby permitting movement of the valve portion of the needle member away from the valve seat in opposition to action of the spring.

2. A method of assembling a nozzle assembly comprising a housing including a central bore having, at one end thereof, a valve seat, an elongated needle member having, at one end thereof, a valve portion engageable with the valve seat, and having, at the other end thereof, an end portion, a retainer member having therein a bore receiving the end portion of the needle, and being fixed to the end portion of the needle, and a spring acting between the housing and the retainer member to bias the valve portion into engagement with the valve seat, said method comprising the steps of locating the needle member in the bore in the housing with the valve portion in engagement with the valve seat and with the end portion extending from the housing, locating a shim outwardly of the housing in adjacent relation to the end portion of the needle member, locating the spring in surrounding relation to the end portion of the needle member and in engagement with the housing, locating the retainer member with the end portion of the needle member passing through the bore in the retainer member, and with the shim between the retainer member and the housing, and with the spring in compression between the retainer member and the housing, fixing the retainer member to the end portion of the needle member with the valve portion of the needle member in engagement with the valve seat, with the shim between the retainer member and the housing, and with the spring in compression between the housing and the retainer member, and removing the shim from between the housing and the retainer member, thereby permitting movement of the valve portion away from the valve seat in opposition to action of the spring.

3. A method of assembling a nozzle assembly comprising a housing including a central bore having, at one end thereof a valve seat, an elongated needle member having, at one end thereof, a valve portion engageable with the valve seat, and having, at the other end thereof, an end portion, a retainer assembly including an inner retainer member having therein a bore receiving the end portion of the needle, and an outer retainer member having therein a bore receiving the end portion of the needle, being located outwardly of the inner retainer member, and being fixed to the end portion of the needle, and a spring acting between the housing and the inner retainer member to bias the valve portion of the needle member into engagement with the valve seat, said method comprising the steps of locating the needle member in the bore in the housing and with the valve portion in engagement with the valve seat, and with the end portion extending from the housing, locating the spring in surrounding relation to the end portion of the needle member and in engagement with the housing, locating the inner retainer member with the end portion of the needle member passing through the bore in the inner retainer member and in engagement with the spring, locating a shim outwardly of and in engagement with the inner retainer member, locating the outer retainer member outwardly of and in engagement with the shim and with the end portion of the needle passing through the bore in the outer retainer member, fixing the outer retainer member to the end portion of the needle member with the valve portion of the needle member in engagement with the valve seat, with the shim between the inner and outer retainer members, and with the spring in compression between the housing and the inner retainer member, and removing the shim from between the retainer members, thereby permitting movement of the valve portion away from the valve seat in opposition to action of the spring.

4. A method of assembling a nozzle assembly comprising a housing including a central bore having, at one end thereof, a valve seat, an elongated needle member having an axis, having, at one end thereof, a valve portion engageable with the valve seat, and having, at the other end thereof, an end portion, a retainer assembly including an inner retainer member having therein a bore receiving the end portion of the needle, and an outer retainer member having therein a bore receiving the end portion of the needle, being located outwardly of the inner retainer member, and being fixed to the end portion of the needle, one of the retainer members having a flat surface extending perpendicularly with respect to the needle member axis and having therein a recess extending diametrically with respect to the needle member axis, and the other of the retainer members having a flat surface having thereon a projection extending diametrically with respect to the needle member axis and having an outer planar surface extending parallel to the flat surfaces, and a spring acting between the housing and the retainer assembly to bias the valve portion into engagement with the valve seat, said method comprising the steps of locating said needle member in the bore in the housing with the valve portion in engagement with the valve seat and with the end portion extending from the housing, locating the spring in surrounding relation to the end portion of the needle member and in engagement with the housing, locating the inner retainer member with the end portion of the needle member passing through the bore in the inner retainer member and in engagement with the spring, thereby biasing the retainer assembly outwardly, and with the flat surface of the one retainer member located remotely from the housing, locating the outer retainer member with the end portion passing through the bore in the outer retainer member and with the flat surface of the one retainer member in engagement with the outer surface of the projection, and fixing the outer retainer member to the end portion of the needle member with the valve portion of the needle member in engagement with the valve seat, with the outer surface of the projection in engagement with the flat surface of the one retainer member, and with the spring in compression, and moving the retainer members relative to each other until the projection is received into the recess and the flat surfaces engage each other, thereby permitting movement of the valve portion of the needle member away from the valve seat in opposition to the action of the spring.

5. A method in accordance with claim 4 and further including the step of rotating said retainer members relative to each other until the projection is received in the recess and the flat surfaces of the retainer members are engaged with each other, thereby affording movement of the valve portion away from the valve seat.

6. A nozzle assembly comprising a housing including an elongated central bore having, at one end thereof, a valve seat, an elongated needle member having, at one end thereof, a valve portion engageable with said valve seat and having, at the other end thereof, an end portion, a retainer fixable to said end portion of said needle member at a predetermined distance from said valve portion of said needle member, a spring acting between said housing and said retainer for biasing said valve portion of said needle member against said valve seat, and removable spacer means for holding said retainer at a predetermined distance from said valve seat during fixing of said end portion of said needle member to said retainer.

7. A nozzle assembly in accordance with claim 6 wherein said removable spacer means is a shim removeably located between said housing and said retainer.

8. A nozzle assembly in accordance with claim 6 wherein said retainer comprises an inner member located adjacent said housing, being engaged by said spring, and having a central bore through which said end portion of said needle member passes, and an outer member which faces said inner member and is fixed to said end portion of said needle member.

9. A nozzle assembly in accordance with claim 8 wherein said removable spacer means comprises a shim removeably located between said inner and outer members.

10. A nozzle assembly in accordance with claim 8 wherein said removable spacer means comprises a flat surface extending on one of said inner and outer members in perpendicularly relation to the elongation of said needle member and having therein a recess extending diametrically with respect to the elongation of said needle member, and a flat surface extending on the other of said inner and outer members in perpendicularly relation to the elongation of said needle member and having thereon a projection extending diametrically with respect to the elongation of said needle member and toward said one of said inner and outer members, and being moveable relative to said one of said inner and outer members between a retracted position wherein said projection is retracted from said recess, extends transversely to said recess, and engages said flat surface of said one of said inner and outer members, whereby to space said inner and outer members from each other, and an operating position wherein said projection extends into said recess and said flat surfaces are engaged, whereby to remove the spacing from between said inner and outer members.

11. A nozzle assembly in accordance with claim 10 wherein said recess is a keyway and said projection is a key.

12. A nozzle assembly comprising a housing including an elongated central bore having, at one end thereof, a valve seat, an elongated needle member having, at one end thereof, a valve portion engageable with said valve seat and having, at the other end thereof, an end portion, a retainer including an inner member having therein a bore receiving said end portion of said needle, and an outer member fixed outwardly of said inner member to said end portion of said needle, one of said inner and outer members having a flat surface extending perpendicularly with respect to the elongation of said needle member and having therein a keyway extending diametrically with respect to the elongation of said needle member, and the other of said inner and outer members having a flat surface extending perpendicularly with respect to the elongation of said needle member and having thereon a projecting key extending diametrically with respect to the elongation of said needle member and toward said one of said inner and outer members and being moveable relative to said one of said inner and outer members between an operating position wherein said key extends into said keyway and said flat surfaces are engaged, and a retracted position wherein said key is retracted from said keyway, extends transversely to said keyway, and engages said flat surface of said one of said inner and outer members.

* * * * *